(12) United States Patent
Lu et al.

(10) Patent No.: US 9,159,502 B2
(45) Date of Patent: Oct. 13, 2015

(54) SUPERCAPACITOR WITH HEXACYANOMETALLATE CATHODE, ACTIVATED CARBON ANODE, AND NON-AQUEOUS ELECTROLYTE

(75) Inventors: Yuhao Lu, Vancouver, WA (US); Sean Andrew Vail, Vancouver, WA (US); Hidayat Kisdarjono, Vancouver, WA (US); Jong-Jan Lee, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 199 days.

(21) Appl. No.: 13/603,322

(22) Filed: Sep. 4, 2012

(65) Prior Publication Data
US 2013/0257389 A1 Oct. 3, 2013

Related U.S. Application Data

(63) Continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012.

(51) Int. Cl.
*H01M 2/16* (2006.01)
*H01G 11/30* (2013.01)

(52) U.S. Cl.
CPC ............... *H01G 11/30* (2013.01); *Y02E 60/13* (2013.01); *Y10T 29/417* (2015.01)

(58) Field of Classification Search
CPC ..... H01M 4/136; H01M 4/58; H01M 10/054; H01M 4/133; H01M 4/134; H01M 4/04; H01M 4/381; Y02E 60/122; Y02E 60/50; C01B 31/00; C01B 31/04; C01B 31/30; C01D 1/02
USPC .............. 429/211, 231.95, 231.6; 252/519.14
See application file for complete search history.

(56) References Cited

U.S. PATENT DOCUMENTS

2012/0328936 A1* 12/2012 Wessells et al. ............... 429/188
2013/0130049 A1* 5/2013 Moilanen et al. .............. 428/532
2013/0244100 A1* 9/2013 Tan et al. ....................... 429/199

OTHER PUBLICATIONS

L.L. Zhang, X.S. Zhao, Carbon-based materials as surpercapacitor electrodes, Chem. Soc. Rev., 38 (2009)2520-2531.

(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A supercapacitor is provided with a method for fabricating the supercapacitor. The method provides dried hexacyanometallate particles having a chemical formula $A_mM1_xM2_y(CN)_6 \cdot pH_2O$ with a Prussian Blue hexacyanometallate, crystal structure, where A is an alkali or alkaline-earth cation, and M1 and M2 are metals with 2+ or 3+ valance positions. The variable m is in the range of 0.5 to 2, x is in the range of 0.5 to 1.5, y is in the range of 0.5 to 1.5, and p is in the range of 0 to 6. The hexacyanometallate particles are mixed with a binder and electronic conductor powder, to form a cathode comprising $A_mM1_xM2_y(CN)_6 \cdot pH_2O$. The method also forms an activated carbon anode and a membrane separating the cathode from the anode, permeable to A and A' cations. Finally, an electrolyte is added with a metal salt including A' cations. The electrolyte may be aqueous.

20 Claims, 5 Drawing Sheets

(56) References Cited

OTHER PUBLICATIONS

J.P. Zheng, P.J. Cygan, T.R. Jow, Hydrous ruthenium oxide as an electrode material for electrochemical capacitors, J. Electrochem. Soc., 142 (1995) 2699-2703.

JA. Widmann et al., insertion electrochemistry, and magnetic properties of a new type of subsubstitutional solid solution of copper, nickel and iron hexacyanoferrates/ hexacya.

A. Eftekhari, Potassium secondary cell based on Prussian blue cathode, J.Power Sources, 126 (2004) 221-228.

Y. Lu, L. Wang, J. Cheng, J.B. Goodenough, Prussian blue: a new framework of electrode materials for sodium battery, Chem. Commun. 52(2012) 6544-6546.

C.D. Wessells, R.A. Huggins, Y. Cui, Copper hexacyanoferrate battery electrodes with long cycle life and high power, Nature Communication, 2(2011) 550.

C.D. Wesseils, S.V. Peddada, R. A. Huggins, Y. Cui, Nickel hexacyanoferrate nanoparticle electrodes for aqueous sodium and potassium ion batteries. Nano Lett., 11(2011) 5421.

C.D. Wessells at al., The effect of insertion species on nanostructured open framework hexacyanoferrate battery electrode, J. ElectElectrochem. Soc., 159(2012) A98-A103.

\* cited by examiner

SUPERCAPACITOR WITH HEXACYANOMETALLATE CATHODE, ACTIVATED CARBON ANODE, AND NON-AQUEOUS ELECTROLYTE

RELATED APPLICATIONS

This application is a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012 now U.S. Pat. No. 8,956,760;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195; filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All the above-referenced applications are incorporated herein by reference.

BACKGROUND OF THE INVENTION

1. Field of the Invention

This invention, generally relates to electrochemical capacitors and, more particularly, to a supercapacitor made from a hexacyanometallate cathode, activated carbon anode, and aqueous electrolyte.

2. Description of the Related Art

A supercapacitor, or electrochemical capacitor (EC), constitutes one type of device for electrochemical energy storage and conversion. The electrochemical capacitor consists of two electrodes separated by an electrolyte-soaked separator by which the two electrodes are electrically isolated. Based upon the electrode type and the energy storage mechanism, the supercapacitor may be classified into one of the two following categories: (1) an electric double layer capacitor (EDLC), in which the energy is stored at the interface between the electrode and electrolyte through electrostatic charge accumulation, or (2) a pseudo-capacitor (or ultra-capacitor), whereby one electrode undergoes faradic reactions while the other electrode maintains the electrostatic charge accumulation.

In comparison to batteries and fuel cells, supercapacitors have the highest power density (watt per kilogram) due to the rapid movement of ions between the electrode and electrolyte. However, at the same time, the energy storage mechanism restricts its energy density (watt-hours per kilogram). Charge adsorption on the electrode surface dominates the energy storage in EDLCs. The performance of electrode materials can be evaluated by capacitance (F/g, Farad/gram), which can be defined as the charge accumulation with the voltage change per gram of electrode material: $C=(\Delta Q/\Delta V)/m$ where Q is the accumulated charge, V is the voltage of the electrode materials, and in is the mass of the active materials of the electrode. The state-of-the-art commercial activated carbon materials have surface areas of 1000-3500 $m^2/g$ and capacitances of ~200 F/g [L. L. Zhang, X. S. Zhao, "Carbon-based materials as supercapacitor electrodes", Chem. Soc. Rev., 38 (2009)2520-2531]. Physical adsorption of the electrostatic charge restricts the capacitance from further increases. Therefore, the introduction of faradic reactions to supercapacitors results in the so-called pseudo-/ultra-capacitors.

In general, pseudo-capacitors demonstrate much larger capacitances than EDLC because Faradic reactions can store charges both on the surface and in the bulk of the electrode materials. Ruthenium oxide ($RuO_2$), for example, exhibits a high capacitance of 720 F/g [J. P. Zheng, P. J. Cygan, T. R. Jaw, "Hydrous ruthenium oxide as an electrode material for electrochemical capacitors", J. Electrochem. Soc., 142 (1995) 2699-2703] based upon the faradic reaction of $RuO_x(OH)_y + zH^+ + ze^- \leftrightarrow RuO_{x-z}(OH)_{y+z}$ where the redox couple, $Ru^{3+/4+}$, is reversible during the dis/charge process. Except for the appropriate redox couples, a robust material for the pseudo-capacitor electrode must demonstrate fast transport of charges and electrons in its structure(s), in order to ensure a high power density. Although Faradic reactions increase the capacitance of electrode materials significantly, both the transfer of charges and migration of ions result in a change of volume, which deteriorates their structure during cycling. For that reason, pseudo-/ultra-capacitors exhibit a shorter cycling life than EDLCs. Thus, more stable materials are actively being developing for this class of capacitor.

FIG. 1 depicts the crystal structure of a metal hexacyanometallate (prior art). Prussian blue analogues belong to a class of mixed valence compounds called transition metal hexacyanometallates. The hexacyanometallates have a general formula $A_mM1_xM2_y(CN)_6$, where M1 and M2 are transition metals. In many cases, the transition metal hexacyanometallates may contain a variety of ions ($A=Co^+$, $Na^+$, $K^+$, $NH_4^+$, $Co^{2+}$, $Cu^{2+}$, etc.) and various amounts of water in the crystal structure. As is shown in the figure, the crystal structure of metal hexacyanometallates has an open framework which can facilitate fast and reversible intercalation processes for alkali and alkaline ions ($A_m$). The number of alkali or alkaline ions in the large cages of this crystallographically porous framework may vary from m=0 to m=2 depending on the valence of M1 and M2.

Twenty years ago, Widmann, et al. demonstrated that $K^+$-ions reversibly insert/deinsert into/from the copper, nickel, and iron hexacyanoferrates/hexacyanocobaltates Prussian blue analogues, $KNiFe(CN)_6$, $KCuFe(CN)_6$, and $KFeFe(CN)_6$) in aqueous solution [A. Widmann, H. Kahlert, I. Petrovic-Prelevic, H. Wulff, Jr Yakhmi, N. Bagkar, F. Scholz, "Structure, insertion electrochemistry, and magnetic properties of a new type of substitutional solid solution of copper, nickel and iron hexacyanoferrates/hexacyanocohaltates", Inorg. Chem., 41 (2002) 5706-5715].

Eftekhari [A. Eftekhari, "Potassium secondary cell based on Prussian blue cathode", J. Power Sources, 126 (2004) 221-228] assembled an iron hexacyanoferrate (Prussian blue)/potassium battery with an organic electrolyte [1M $KBF_4$ in ethylene carbonate/ethylmethyl carbonate (3:7 by wt.)]. The results proved that Prussian blue was a good electrode material for the potassium-ion battery with a reversible capacity of ca. 75 mAh/g.

Dr. Goodenough's group [Y. Lu, L. Wang, J. Cheng, J. B. Goodenough, "Prussian blue: a new framework of electrode materials for sodium battery", Chem. Commun. 52 (2012) 6544-6546] investigated a series of Prussian blue analogues in a sodium battery with organic electrolyte, and found that $KFe(II)Fe(III)(CN)_6$ demonstrated the highest capacity of ca. 95 mAh/g, while $KMnFe(CN)_6$, $KNiFe(CN)_6$, $KCuFe(CN)_6$, and $KCoFe(CN)_6$ demonstrated a capacity of 50~70 mAh/g, in the first 30 cycles, the capacity retention of $KFeFe(CN)_6$ was higher than 97%.

Very recently, Cui's group studied the Na$^+$/K$^+$ ion intercalation of copper (KCuFe(CN)$_6$) and nickel hexacyanoferrates (KNiFe(CN)$_6$) in aqueous solution. Their results demonstrated the rapid movement of Li$^+$, Na$^+$, K$^+$, and NH$_4^+$-ions in the Prussian blue analogues, as well as long cycling life for the electrode materials [C. D. Wessells, R. A. Huggins, Y. Cui, "Copper hexacyanoferrate battery electrodes with long cycle life and high power", *Nature Communication*, 2 (2011) 550; C. D. Wessells, S. V. Peddada, R. A. Huggins, Y. Cui, "Nickel hexacyanoferrate nanoparticle electrodes for aqueous sodium and potassium ion batteries", *Nano Lett.*, 11 (2011) 5421-5425; C. D. Wessells, S. V. Peddada, M. T. McDowell, R. A. Huggins, Y. Cui, "The effect of insertion species on nanostructured open framework hexacyanoferrate battery electrode", *J. Electrochem. Soc.*, 159 (2012) A98-A103].

The fast ion movement makes it possible for the Prussian blue analogues to perform effectively as the electrode in supercapacitors. It is worth noting that iron ions at the M2 site in the above-mentioned materials remain at a high oxidation state (Fe$^{3+}$) and the materials have to accept more intercalated ions to reduce the iron-ions (Fe$^{2+}$), which requires the sources for the intercalated ions to couple the Prussian blue electrode. On the other hand, the Mn$^{2+}$, Ni$^{2+}$, Cu$^{2+}$ and Fe$^{2+}$ at the M1 site need a high voltage to deinsert the A-ion and to oxidize the M1 to the 3+ state. The voltage is so high that H$_2$O decomposes in an aqueous electrolyte prior to oxidizing the M1. Therefore, only the Fe at the M2 site can perform the redox cycle (Fe$^{2+}$/Fe$^{3+}$) in an aqueous electrolyte for this supercapacitor application. If the Prussian blue analogues for a supercapacitor application have a high oxidation state (Fe$^{3+}$) at the M2 site, the anode must source the supply of the intercalated ions. Cui's group, for instance, used a large, partially charged Prussian blue electrode as the counter electrode to provide a Na$^+$ or K$^+$ source. Therefore, it is impossible to use these materials in supercapacitors because the other electrode must be activated carbon, which cannot function as an ion-source for the Prussian blue analogues.

It would be advantageous if a supercapacitor could be fabricated using a Prussian blue cathode and an activated carbon anode.

For greater safety, it would be advantageous if the above-mentioned supercapacitor could be fabricated with an aqueous electrolyte.

SUMMARY OF THE INVENTION

To address the above-mentioned problems, A$_m$M1$_x$M2$_y$(CN)$_6$·pH$_2$O is presented as an electrode in a supercapacitors, representing species such as K$_m$MnFe(CN)$_6$·pH$_2$O, K$_m$NiFe(CN)$_6$·pH$_2$O, K$_m$CuFe(CN)$_6$·pH$_2$O, and K$_m$Fe$_2$(CN)$_6$·pH$_2$O. For example, the charge process for a K$_m$CuFe(CN)$_6$·pH$_2$O electrode supercapacitor is:

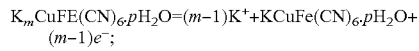

$$K_m CuFE(CN)_6 \cdot pH_2O = (m-1)K^+ + KCuFe(CN)_6 \cdot pH_2O + (m-1)e^-;$$

These materials can release ions from themselves, which eliminates the need for an additional ion-source in the supercapacitor. The supercapacitor simultaneously exhibits a high energy density and power density. The Prussian blue analogues for the supercapacitors can be generally expressed as A$_m$M1$_x$M2$_y$(CN)$_6$·pH$_2$O whereby A=Li, Na, K, Mg, NH$_4$, etc., and M1, M2=Ti, V, Cr, Mn, Fe, Co, Ni, Cu, Zn, Ca, Mg, etc. The ratio of M1 and M2 can vary.

Accordingly, a method is provided for fabricating a supercapacitor. The method provides dried hexacyanometallate particles having a chemical formula A$_m$M1$_x$M2$_y$(CN)$_6$·pH$_2$O with a Prussian Blue hexacyanometallate crystal structure, where A is an alkali or alkaline-earth cation, and M1 and M2 are metals with 2+ or 3+ valance positions. The variable m is in the range of 0.5 to 2, x is in the range of 0.5 to 1.5, y is in the range of 0.5 to 1.5, and p is in the range of 0 to 6. The hexacyanometallate particles are mixed with a binder and electronic conductor powder, to form a cathode comprising A$_m$M1$_x$M2$_y$(CN)$_6$·pH$_2$O. The method also forms an activated carbon anode and a membrane separating the cathode from the anode, permeable to A and A' cations. Finally, an electrolyte is added with a metal salt including A' cations.

The A' and A cations may be Li$^+$, Na$^+$, K$^+$, Mg$^{2+}$, NH$_4^+$, or Ca$^{2+}$. The A and A' cations may, or may not be the same element. The M1 and M2 metals may be Ti, V, Cr, Mn, Fe, Co, Ni, Cu, Zn, Ca, or Mg. The M1 and M2 metal may, or may not be the same metal. In one aspect, the electrolyte is an aqueous electrolyte.

Additional details of the above-described method, a supercapacitor device, and a method for using a supercapacitor are presented below.

DETAILED DESCRIPTION

Figure 1:
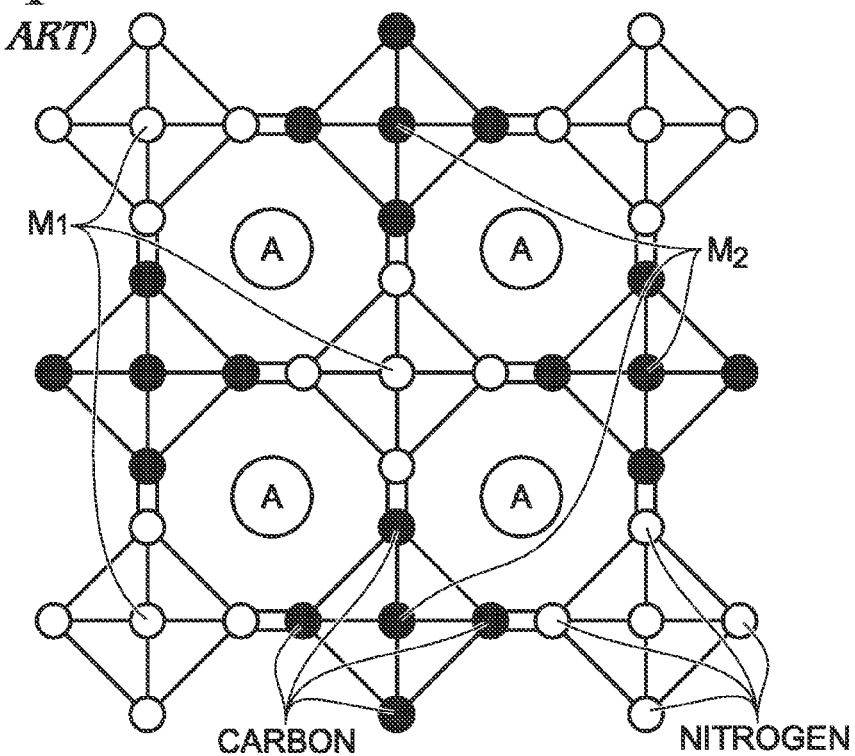
FIG. 1 depicts the crystal structure of a metal hexacyanometallate (prior art).
Figure 2:
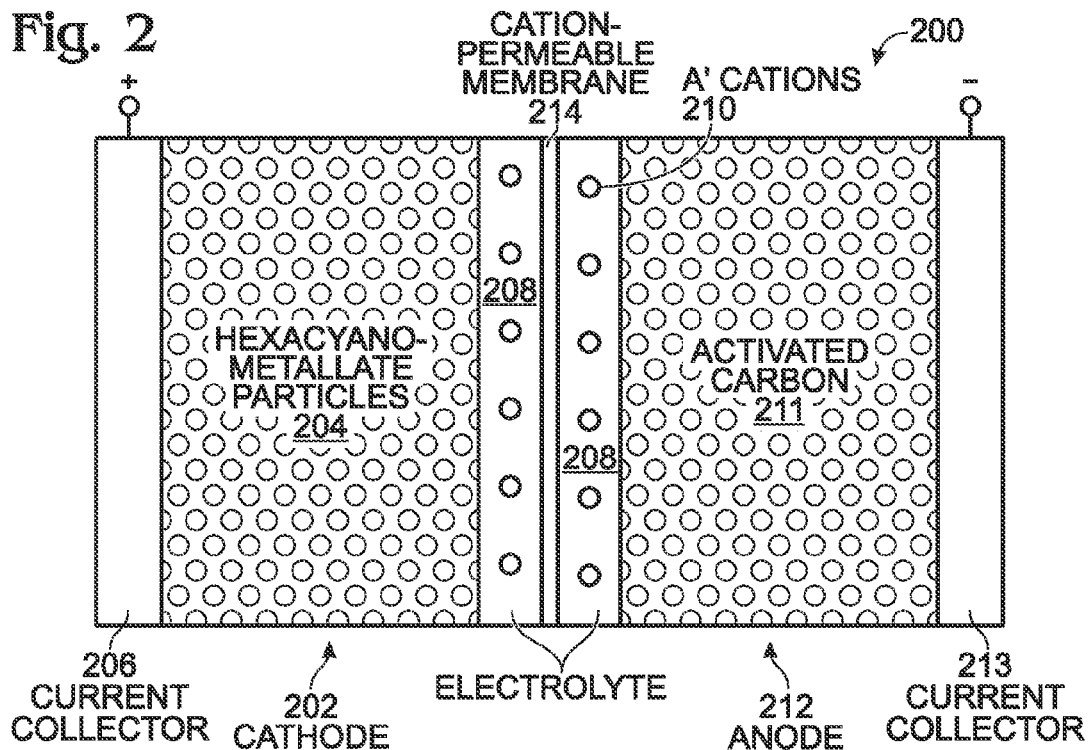
FIG. 2 is a partial cross-sectional view of a supercapacitor.

FIG. 2 is a partial cross-sectional view of a supercapacitor. The supercapacitor 200 comprises a cathode 202 with hexacyanometallate particles 204 overlying a current collector 206. The hexacyanometallate particles 204 have the chemical formula A$_m$M1$_x$M2$_y$(CN)$_6$·pH$_2$O, and have a Prussian Blue hexacyanometallate crystal structure (see FIG. 1). The A cations may be either alkali or alkaline-earth cations. For example, the A cations may be Li$^+$, NH$_4^+$, Na$^+$, K$^+$, Mg$^{2+}$, or Ca$^{2+}$.

M1 is a metal with 2+ or 3+ valance positions. Likewise, M2 is a metal with 2+ or 3+ valance positions. For example, the M1 and M2 metals may be Ti, V, Cr, Mn, Fe, Co, Ni, Cu, Zn, Ca, or Mg. The M1 metal may be the same metal as the M2 metal, or a different metal than the M2 metal. From the hexacyanometallate formula above, m is in the range of 0.5 to 2, x is in the range of 0.5 to 1.5, y is in the range of 0.5 to 1.5, and p is in the range of 0 to 6. More specifically, if A is an alkali cation, m is in the range of 1 to 2, and if A is an alkaline-earth cation, m is in the range of 0.5 to 1.

The supercapacitor 200 further comprises an electrolyte 208 with a metal salt including A' cations 210, and an anode 212 with activated carbon 211 overlying a current collector 213. A membrane 214 separates the cathode 202 from the anode 212, which is permeable to A and A' cations. The A' cations 210 may be Li$^+$, Na$^+$, K$^+$, Mg$^{2+}$, NH$_4^+$, or Ca$^{2+}$. Note: the A and A' cations may be the same or a different material. In one aspect, the electrolyte 208 is an aqueous electrolyte.

Practically, the cathode 202 and anode 212 "touch" the membrane 214. As shown, a space is left for electrolyte 208 (liquid) so that the A' cations 210 may be depicted. Both the hexacyanometallate particles 204 and activated carbon 211 are porous materials, with electrolyte filling the pores.

The supercapacitor 200 comprises a positive electrode 202 ($A_mM1_xM2_y(CN)_6 \cdot pH_2O$) and a negative electrode 212 (activated carbon) separated by an ion-permeable membrane 214. The material, $A_mM1_xM2_y(CN)_6 \cdot pH_2O$, demonstrates a cubic framework that consists of a M1-N—C-M2 skeleton and large interstitial space as shown in FIG. 1. M1 and M2 are the same or different metal ions ($M_1$, $M_2$=Ti, V, Cr, Mn, Fe, Co, Ni, Cu, Zn, Ca, Mg, etc.) and their ratio can vary. A-ions can easily and reversibly move in the interstitial space. The anode is an activated carbon material. In the supercapacitor, aqueous solution, non-aqueous solution, gel, polymer and solid ion-conductor can be used as the electrolyte 208.

For the case where the A-ions in $A_mM1_xM2_y(CN)_6 \cdot pH_2O$ are the same as A' ions in electrolyte, the A-ions move back and forth between anode and cathode through the electrolyte. In the charge process, A-ions are deinserted from the Prussian blue analogue positive electrode and are subsequently adsorbed on the surface of the negative electrode of activated carbon. In the discharge process, the A-ions are desorbed from the activated carbon surface and inserted into the Prussian blue lattice. For the case where the A-ions in $A_mM1_xM2_y(CN)_6 \cdot pH_2O$ are not the same as A' ions in electrolyte, it is primarily the A'-ions that move back and forth between anode and cathode through electrolyte during the charge/discharge process. However, during the first charge process, A-ions are deinserted from the Prussian blue analogue positive electrode and remain in the electrolyte. Since the number of A'-ions is much larger than the number A-ions in electrolyte, the A'-ion are the majority species that move back and forth between the cathode and anode at cycling.

For example, in the charge process of a $Na_mCuFe(CN)_6 \cdot pH_2O$ supercapacitor with Na-salt aqueous electrolyte, Na-ions are deinserted from the Prussian blue analogue positive electrode and are subsequently adsorbed on the surface of the negative electrode of activated carbon. Meanwhile, electrons move from positive electrode to negative electrode through an external circuit.

Positive electrode:

$$Na_mCuFe(CN)_6 \rightarrow (m-1)Na^+ + NaCuFe(CN)_6 + (m-1)e^-;$$

Negative electrode:

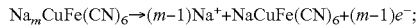

□=Activated carbon.

In the discharge process, all processes occur in the reverse directions

In an example of a $K_mCuFe(CN)_6 \cdot pH_2O$ supercapacitor with Na-salt aqueous electrolyte:

The first charge at positive electrode:

$$K_mCuFe(CN)_6 \cdot pH_2O = (m-1)K^+ + KCuFe(CN)_6 \cdot pH_2O + (m-1)e^-;$$

The first charge at negative electrode:

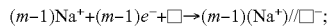

□=Activated carbon.

The first discharge at positive electrode:

$$KCuFe(CN)_6 \cdot pH_2O + (m-1)Na^+ + (m-1)e^- = Na_{m-1}KCuFe(CN)_6 \cdot pH_2O;$$

at negative electrode:

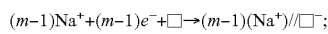

□=Activated carbon.

In subsequent charge processes, the processes occur in the reverse direction of the first discharge process. That is, only Na+ moves back and forth.

In one aspect, the positive electrode fabrication process flow is as follows. Dried $A_mM_1M_2(CN)_6$ (A=Li, $NH_4$, Na, K, Mg, or Ca) powder with a particle size of 5 nm-1 μm is mixed with binder, such as polytetrafluoroethylene (PTFE), polyvinylidene fluoride (PVDF), etc., and an electronic conductor powder, in a low boiling point solvent to form a paste. The electronic conductor powder may be carbon black, carbon nanotube, carbon nanowire, grapheme, etc., with particle size of 5 nm-10 μm. The $A_mM_1M_2(CN)_6$ (A=Na, K, Mg, or Ca) powder contains crystal water even after the drying process. The water is shown in the formula as $pH_2O$. The composition of the paste is 40 wt. %-95 wt. % $A_mM_1M_2(CN)_6$, 0 wt. %-50 wt. % electronic conductor powder, and 1 wt. %-30 wt. % binder. The paste is coated on a metal foil or mesh (Al, Ti, etc.) that is used as the current collector for the positive electrode. Alternatively, the paste can be pressed to form relatively thick plates, for example greater than 1 mm, which can be subsequently assembled with a current collector.

The negative (anode) electrode is fabricated as follows. A dried activated carbon powder is mixed with a binder such as PTFE or PVDF, etc., and an electronic conductor powder (carbon black, carbon nanotube, carbon nanowire, grapheme, etc., with particle size of 5 nm-10 μm) in low boiling point solvent to form a paste. The composition of the paste is 40 wt. %-95 wt. % activated carbon, 0 wt. %-50 wt. % electronic conductor powder, and 1 wt. %-30 wt. % binder. The paste is coated on a metal foil or mesh (Cu, Ti, Ni, etc.) that is used as the current collector for the negative electrode. Alternatively, the paste can be pressed to form relatively thick plates, for example greater than 1 mm, which can be subsequently assembled with a current collector.

Figure 3A:
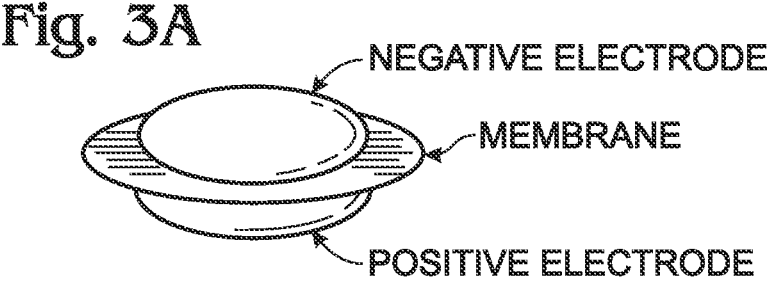
FIGS. 3A through 3C depict three types of supercapacitor configurations.
Figure 3B:
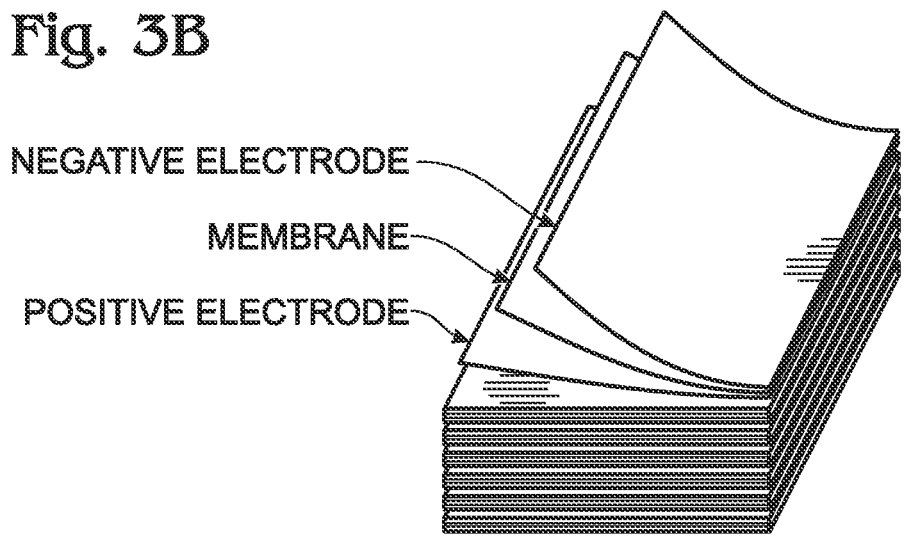
Figure 3C:
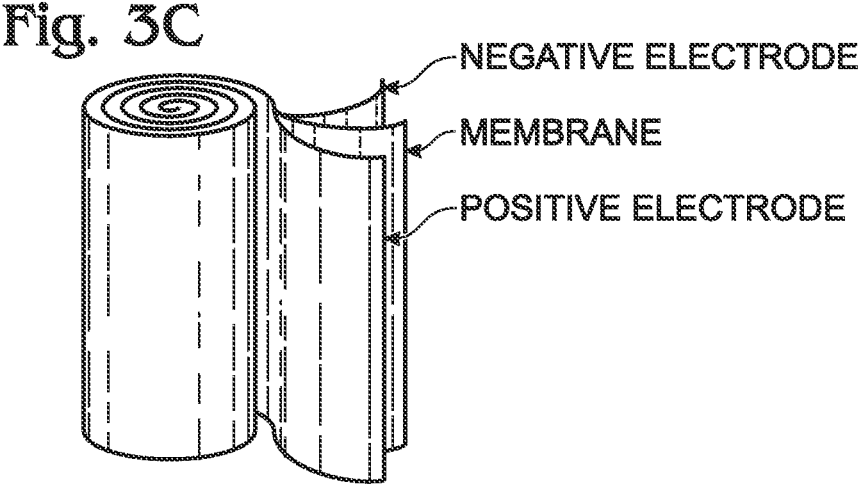

FIGS. 3A through 3C depict three types of supercapacitor configurations. After the positive electrode and the negative electrode are prepared, the supercapacitor can be assembled. A membrane separates the positive and negative electrodes. The membrane can be one of aqueous, polymer, gel, solid materials, or combinations thereof. The sandwich electrode assembly can be configured according to the container shape of the supercapacitor. The electrode assembly is put into a container. If a liquid solution is needed to help the ion transport, it can be injected into the container. After all the electrodes are thoroughly soaked in electrolyte, the container is sealed.

For an all-solid supercapacitor, a different composition may be utilized for the electrode fabrication. The all-solid supercapacitor consists of the positive electrode and the negative electrode separated by an ion-conducting solid electrolyte. For example, in a sodium-based supercapacitor, $\beta$-$Al_2O_3$, $NaZr_2(PO_4)_3$, $Na_4Zr_2(SiO_4)_3$ and their derivatives can be used as the $Na^+$-ion solid electrolyte. In order to improve the ions transport in the electrode, the 5 wt. %-60 wt. % solid electrolyte powder can be added into the pastes of the positive electrode and the negative electrode during fabrication. After obtaining the electrode, they can be assembled into a supercapacitor as described above.

Proof-of-Concept Prototype: Prussian Blue Analogue Supercapacitor

Prussian blue analogue electrode (positive electrode): 50 wt % $Na_mCuFe(CN)_6 \cdot pH_2O$+40 wt % Super P+10 wt % PTFE (corresponds to 3.6 mg of activated material).

Negative electrode: 70 wt % activated carbon (YP-50F)+20 wt % Super P+10 wt % PTFE.

Electrolyte: 1 M $Na_2SO_4$ (aqueous) solution adjusted to pH~2.7 with $H_2SO_4$.

Figure 4:
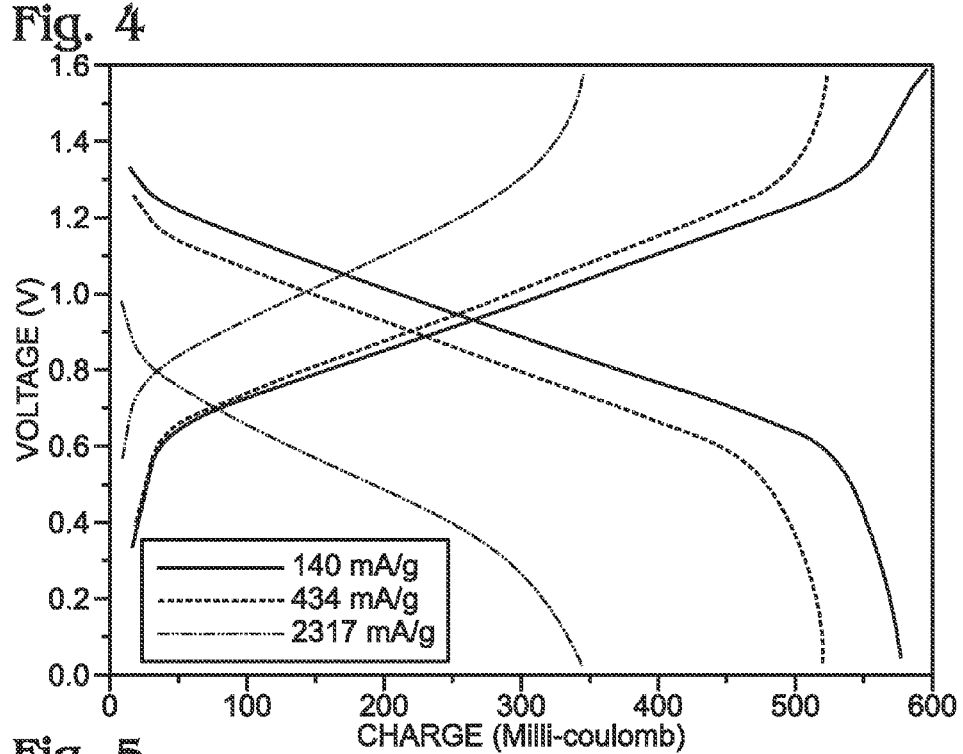
FIG. 4 is a graph depicting charge and discharge curves for the prototype supercapacitor at different currents.

FIG. 4 is a graph depicting charge and discharge curves for the prototype supercapacitor at different currents. The prototype supercapacitor demonstrates good performance at high current. When the current is 140 mA/g, the supercapacitor can be discharged (or charged) in 20 minutes within the voltage range of 0-1.6 V. A current of 434 mA/g corresponds to the charge or discharge time of approximately 10 minutes. A current of 2317 mA/g fully discharges or charges the supercapacitor in 1 minute.

Figure 5:
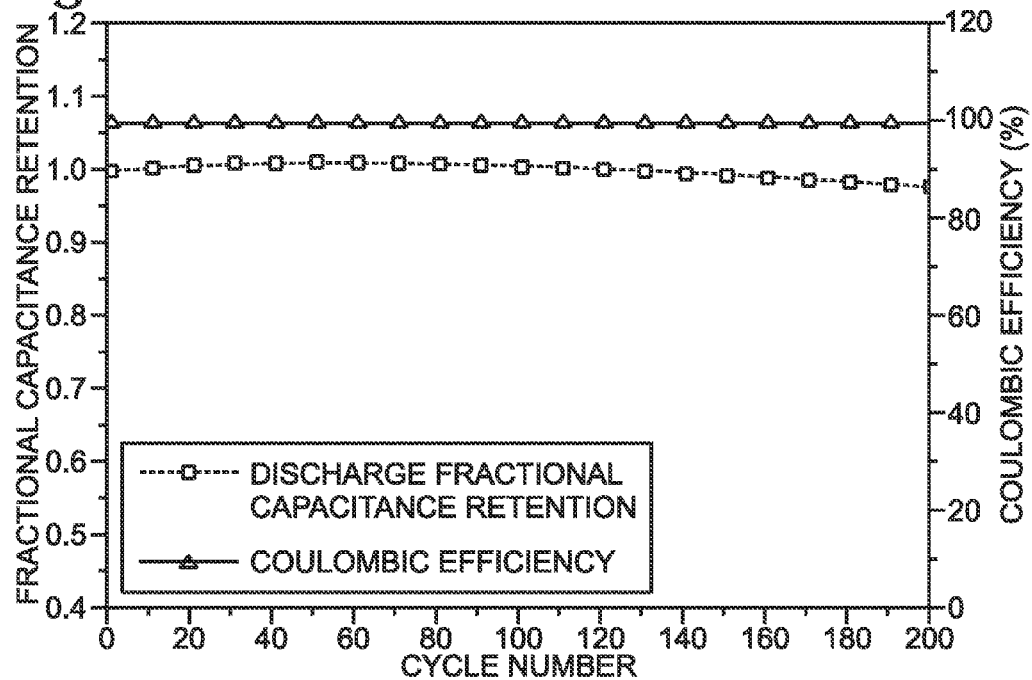
FIG. 5 is a graph depicting fractional capacitance retention and coulombic efficiency of the prototype supercapacitor at a current of 2317 mA/g.

FIG. 5 is a graph depicting fractional capacitance retention and coulombic efficiency of the prototype supercapacitor at a current of 2317 mA/g. The supercapacitor demonstrates robust cycling behavior. Following 200 cycles, the capacitance loss is only ~2%. At the same time, the coulombic efficiency of the supercapacitor is higher than 99.8%.

Figure 6:
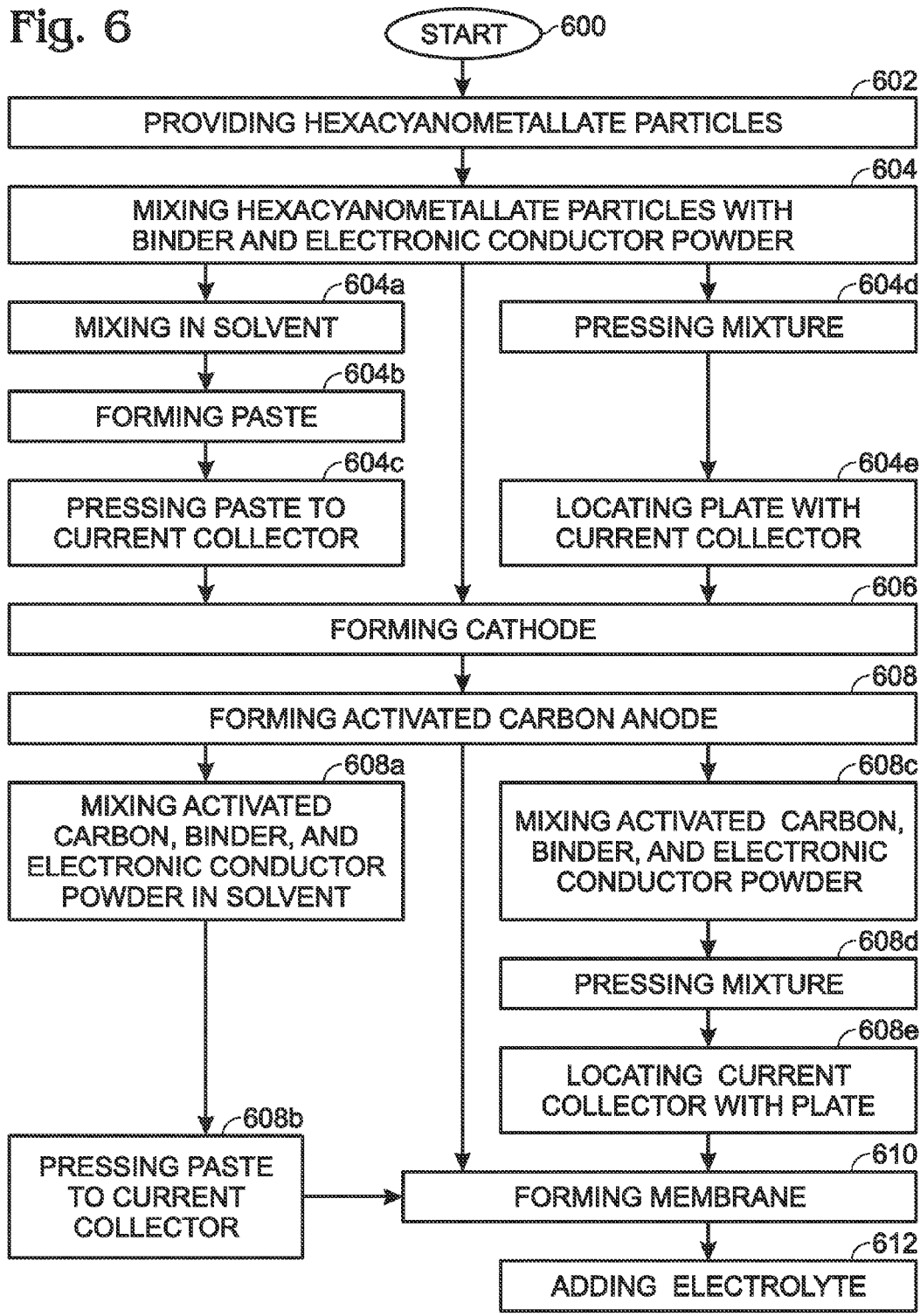
FIG. 6 is a flowchart illustrating a method for fabricating a supercapacitor.

FIG. 6 is a flowchart illustrating a method for fabricating a supercapacitor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 provides dried hexacyanometallate particles having a chemical formula $A_mM1_xM2_y(CN)_6 \cdot pH_2O$ with a Prussian Blue hexacyanometallate crystal structure. "A" is either an alkali or alkaline-earth cations, and M1 is a metal with 2+ or 3+ valance positions. Likewise, M2 is a metal 2+ or 3+ valance positions, n is in the range of 0.5 to 2, x is in the range of 0.5 to 1.5, y is in the range of 0.5 to 1.5, and p is in the range of 0 to 6. For example, the A cations may be $Li^+$, $Na^+$, $K^+$, $Mg^{2+}$, $NH_4^+$, or $Ca^{2+}$. The M1 metal may be Ti, V, Cr, Mn, Fe, Co, Ni, Cu, Zn, Ca, or Mg for example. Likewise, the M2 metal may be Ti, V, Cr, Mn, Fe, Co, Ni, Cu, Zn, Ca, or Mg. The M1 may be the same metal as the M2 metal or a different metal than the M2 metal.

Step 604 mixes the hexacyanometallate particles with a binder and electronic conductor powder. Step 606 forms a cathode comprising $AmM1xM2y(CN)6 \cdot pH_2O$. Step 608 forms an activated carbon anode. Step 610 forms a membrane separating the cathode from the anode, permeable to A and A' cations. Step 612 adds an electrolyte with a metal salt including A' cations. In one aspect, the electrolyte is aqueous.

In one aspect, Step 604 mixes the hexacyanometallate particles with a binder and electronic conductor powder using the following substeps. Step 604a mixes in a low boiling point solvent, forming a mixture. Some examples of low boiling point solvents include amyl acetate, acetone, diethyl carbonate, dimethyl carbonate, and n-methyl-2-pyrrolidone (NMP). Step 604b dries the mixture, forming a $A_mM1_xM2_y(CN)_6 \cdot pH_2O$ paste. Step 604c presses the paste to a metal current collector, to increase the density of the hexacyanometallate particles.

Alternatively, Step 604d presses (die casts) the mixture to form a self-supporting plate, and Step 604e locates a metal current collector adjacent to, and in contact with the plate.

Typically, the dried hexacyanometallate particles have a size in the range of 5 nanometers (nm) to 10 microns. The binder may be PTFE or PVDF, for example. Typically, the electronic conductor powder is carbon black, carbon nanotubes, carbon nanowire, or grapheme, having a particle size in the range of 5 nm to 10 microns. In one aspect, Step 604 forms the $A_mM1_xM2_y(CN)_6 \cdot pH_2O$ paste with 40 to 95 weight (wt) % $A_mM1_xM2_y(CN)_6 \cdot pH_2O$, 0 to 50 wt % electronic conductor powder, and 1 to 30 wt % binder.

In another aspect, forming the activated carbon anode in Step 608 includes the following substeps. Step 608a mixes activated carbon, a binder, and an electronic conductor powder with a low boiling point solvent to form a paste. Step 608b presses the paste to a metal current collector to increase the density of the activated carbon.

Alternatively, Step 608c mixes activated carbon, binder, and an electronic conductor powder. Step 608d presses (die casts) the mixture to form a plate. Step 608e locates a metal current collector adjacent to, and in contact with plate.

The paste formed in Steps 608a and 608c may be 40 to 95 weight (wt) % activated carbon, 0 to 50 wt % electronic conductor powder, and 1 to 30 wt % binder.

In one aspect, adding the electrolyte in Step 612 includes the A' cations being $Li^+$, $Na^+$, $K^+$, $Mg^{2+}$, $NH_4^+$, or $Ca^{2+}$. The A and A' cations may be the same of different elements.

Figure 7:
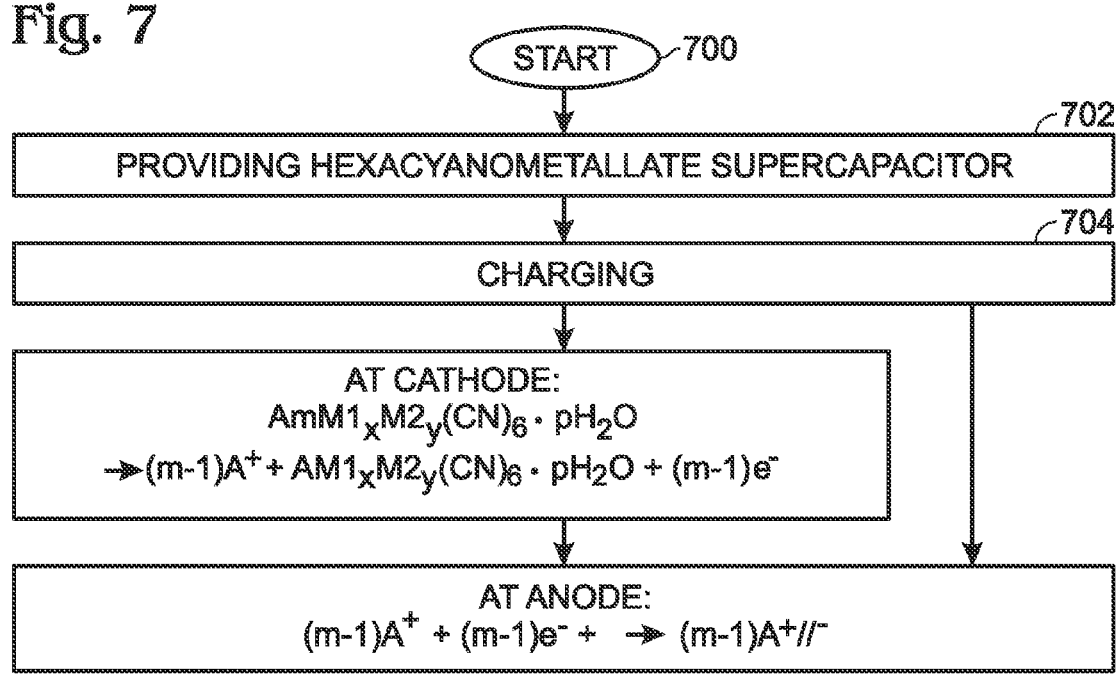
FIG. 7 is a flowchart illustrating a method for using a supercapacitor.

FIG. 7 is a flowchart illustrating a method for using a supercapacitor. The method begins at Step 700, Step 702 provides a cathode with hexacyanometallate particles overlying a current collector. As described in detail above, the hexacyanometallate particles having a chemical formula $A_mM1_xM2_y(CN)_6 \cdot pH_2O$, and have a Prussian Blue hexacyanometallate crystal structure. The A cations may be alkali or alkaline-earth cations. M1 and M2 are metals with 2+ or 3+ valance positions. The variable m is in the range of 0.5 to 2, x is in the range of 0.5 to 1.5, y is in the range of 0.5 to 1.5, and p is in a range of 0 to 6. The supercapacitor further comprises an electrolyte with a metal salt including A' cations, an activated carbon anode, and a membrane separating the cathode from the anode, permeable to A and A' cations. The electrolyte may be aqueous.

Step 704 charges the supercapacitor as follows:
at the cathode,

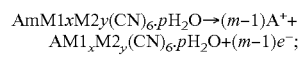

$$AmM1xM2y(CN)_6 \cdot pH_2O \rightarrow (m-1)A^+ + AM1_xM2_y(CN)_6 \cdot pH_2O + (m-1)e^-;$$

at the anode,

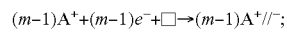

$$(m-1)A^+ + (m-1)e^- + \square \rightarrow (m-1)A^+//^-;$$

□=activated carbon.

The A and A' cations may be $Li^+$, $Na^+$, $K^+$, $Mg^{2+}$, $NH_4^+$, or $Ca^{2+}$. The A and A' cations may, or may not be the same materials. The M1 and M2 metals may be Ti, V, Cr, Mn, Fe, Co, Ni, Cu, Zn, Ca, or Mg. The M1 and M2 metals may, or may not be the same metal.

A supercapacitor with a hexacyanometallate cathode and non-metal anode has been provided with an associated cathode fabrication process. Examples of particular materials and process steps have been presented to illustrate the invention. However, the invention is not limited to merely these examples. Other variations and embodiments of the invention will occur to those skilled in the art.

We claim:

1. A method for fabricating a supercapacitor, the method comprising:
   providing dried hexacyanometallate particles having a chemical formula $A_mM1_xM2_y(CN)6 \cdot pH_2O$ with a Prussian Blue hexacyanometallate crystal structure, wherein A-ions are deinserted and inserted, respectively, during supercapacitor charge and discharge cycling;
   where A is selected from a group consisting of alkali and alkaline-earth cations;
   where M1 is a metal selected from a group consisting of 2+ and 3+ valance positions;
   where M2 is a metal selected from a group consisting of 2+ and 3+ valance positions;
   where m is in a range of 0.5 to 2;
   where x is in a range of 0.5 to 1.5;
   where y is in a range of 0.5 to 1.5;
   where p is in a range of 0 to 6;

mixing the hexacyanometallate particles with a binder and electronic conductor powder;

forming a cathode comprising $A_mM1_xM2_y(CN)_6 \cdot pH_2O$;

forming an activated carbon anode capable of physically adsorbing and deadsorbing cations, respectively, during supercapacitor charge and discharge cycling;

forming a membrane separating the cathode from the anode, permeable to A and A' cations; and, adding a non-aqueous electrolyte with a metal salt including A' cations.

2. The method of claim 1 wherein mixing the hexacyanometallate particles with a binder and electronic conductor powder includes:

mixing in a low boiling point solvent, forming a mixture;
drying the mixture, forming a $A_mM1_xM2_y(CN)_6 \cdot pH_2O$ paste; and,
pressing the paste to a metal current collector, to increase the density of the hexacyanometallate particles.

3. The method of claim 1 wherein mixing the hexacyanometallate particles with a binder and electronic conductor powder includes:

pressing the mixture to form a self-supporting plate; and,
locating a metal current collector adjacent to, and in contact with the plate.

4. The method of claim 1 wherein A cations are selected from a first group consisting of $Li^+$, $Na^+$, $K^+$, $Mg^{2+}$, $NH_4^+$, and $Ca^{2+}$; and, wherein A' cations are selected from a first group consisting of $Li^+$, $Na^+$, $K^+$, $Mg^{2+}$, $NH_4^+$, and $Ca^{2+}$.

5. The method of claim 1 wherein the M1 metal is selected from a group consisting of Ti, V, Cr, Mn, Fe, Co, Ni, Cu, Zn, Ca, and Mg; and, wherein the M2 metal is selected from a group consisting of Ti, V, Cr, Mn, Fe, Co, Ni, Cu, Zn, Ca, and Mg.

6. The method of claim 1 wherein the M1 metal is selected from a group consisting of the same metal as the M2 metal and a different metal than the M2 metal.

7. The method of claim 1 wherein providing the dried hexacyanometallate particles includes providing particles having a size in a range of 5 nanometers (nm) to 10 microns.

8. The method of claim 1 wherein mixing the hexacyanometallate particles with the binder and electronic conductor powder includes mixing with a binder selected from a group consisting of polytetrafluoroethylene (PTFE) and polyvinylidene fluoride (PVDF).

9. The method of claim 1 wherein mixing the hexacyanometallate particles with the binder and electronic conductor powder includes mixing with an electronic conductor powder selected from a group consisting of carbon black, carbon nanotubes, carbon nanowire, and grapheme, having a particle size in a range of 5 nm to 10 microns.

10. The method of claim 1 wherein mixing the hexacyanometallate particles with the binder and electronic conductor powder includes forming a paste with 40 to 95 weight (wt) % $A_mM1_xM2_y(CN)_6 \cdot pH_2O$, 0 to 50 wt % electronic conductor powder, and 1 to 30 wt % binder.

11. The method of claim 1 wherein forming the activated carbon anode includes:

mixing activated carbon, a binder, and an electronic conductor powder with a low boiling point solvent to form a paste;
pressing the paste to a metal current collector to increase the density of the activated carbon.

12. The method of claim 11 wherein forming the activated carbon anode includes forming a paste with 40 to 95 weight (wt) % activated carbon, 0 to 50 wt % electronic conductor powder, and 1 to 30 wt % binder.

13. The method of claim 1 wherein forming the activated carbon anode includes:

mixing activated carbon, a binder, and an electronic conductor powder;
pressing the mixture to form a plate; and,
locating a metal current collector adjacent to, and in contact with plate.

14. The method of claim 1 wherein the A cations are selected from a group consisting of the same material as the A' cations and a different material than the A' cations.

15. A method for using a supercapacitor, the method comprising:

providing a cathode with hexacyanometallate particles overlying a current collector, the hexacyanometallate particles having a chemical formula $A_mM1_xM2_y(CN)_6 \cdot pH_2O$, and having a Prussian Blue hexacyanometallate crystal structure;

where A cations are selected from a group consisting of alkali and alkaline-earth cations;
where M1 is a metal selected from a group consisting of 2+ and 3+ valance positions;
where M2 is a metal selected from a group consisting of 2+ and 3+ valance positions;
where m is in a range of 0.5 to 2;
where x is in a range of 0.5 to 1.5;
where y is in a range of 0.5 to 1.5;
where p is in a range of 0 to 6;

the supercapacitor further comprising a non-aqueous electrolyte with a metal salt including A' cations, an activated carbon anode, and a membrane separating the cathode from the anode, permeable to A and A' cations;

charging the supercapacitor as follows:
at the cathode, deinserting A-ions

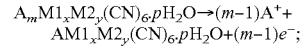

$A_mM1_xM2_y(CN)_6 \cdot pH_2O \rightarrow (m-1)A^+ + AM1_xM2_y(CN)_6 \cdot pH_2O + (m-1)e^-$;

at the anode, physically adsorbing cations

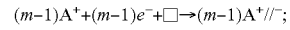

$(m-1)A^+ + (m-1)e^- + \square \rightarrow (m-1)A^+//^-$;

$\square$=activated carbon.

16. The method of claim 15 wherein the A cations are selected from a first group consisting of $Li^+$, $Na^+$, $K^+$, $Mg^{2+}$, $NH_4^+$, and $Ca^{2+}$; and, wherein the A' cations are selected from a first group consisting of $Li^+$, $Na^+$, $K^+$, $Mg^{2+}$, $NH_4^+$, and $Ca^{2+}$.

17. The method of claim 15 wherein the M1 metal is selected from a group consisting of Ti, V, Cr, Mn, Fe, Co, Ni, Cu, Zn, Ca, and Mg; and, wherein the M2 metal is selected from a group consisting of Ti, V, Cr, Mn, Fe, Co, Ni, Cu, Zn, Ca, and Mg.

18. The method of claim 15 wherein the M1 metal is selected from a group consisting of the same metal as the M2 metal and a different metal than the M2 metal.

19. The method of claim 15 wherein the A cations are selected from a group consisting of the same material as the A' cations and a different material than the A' cations.

20. The method of claim 15 further comprising:
discharging the supercapacitor as follows:
at the anode, physically deadsorbing cations

$(m-1)(A^+)//\square^- \rightarrow (m-1)A^+ + (m-1)e^- + \square$;

$\square$=Activated carbon;
at the cathode, inserting A-ions

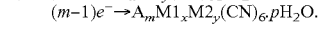

$(m-1)A^+ + AM1_xM2_y(CN)_6 \cdot pH_2O + (m-1)e^- \rightarrow A_mM1_xM2_y(CN)_6 \cdot pH_2O$.

* * * * *